(12) United States Patent
Martin et al.

(10) Patent No.: US 8,440,067 B2
(45) Date of Patent: May 14, 2013

(54) PROCESS FOR REMOVING WATER FROM ALKALI METAL AMALGAM

(75) Inventors: Marc Martin, Ludwigshafen (DE); Günther Huber, Ludwigshafen (DE); Michael Lutz, Speyer (DE); Wolfgang Kanther, Dannstadt-Schauernheim (DE); Josef Guth, Freinsheim (DE); Holger Friedrich, Worms (DE)

(73) Assignee: BASF SE, Ludwigshafen (DE)

( * ) Notice: Subject to any disclaimer, the term of this patent is extended or adjusted under 35 U.S.C. 154(b) by 1106 days.

(21) Appl. No.: 12/295,371

(22) PCT Filed: Mar. 29, 2007

(86) PCT No.: PCT/EP2007/053033
§ 371 (c)(1),
(2), (4) Date: Feb. 5, 2009

(87) PCT Pub. No.: WO2007/113209
PCT Pub. Date: Oct. 11, 2007

(65) Prior Publication Data
US 2009/0301897 A1    Dec. 10, 2009

(30) Foreign Application Priority Data
Mar. 31, 2006  (EP) .................................... 06112058

(51) Int. Cl.
*C25B 1/44*    (2006.01)
(52) U.S. Cl.
USPC ............ 205/529; 205/406; 205/407; 205/408

(58) Field of Classification Search .......... 205/406–409, 205/529
See application file for complete search history.

(56) References Cited

U.S. PATENT DOCUMENTS

| | | | | |
|---|---|---|---|---|
| 3,589,995 A | * | 6/1971 | McChesney | 204/202 |
| 4,161,433 A | * | 7/1979 | De Nora et al. | 205/527 |
| 4,204,937 A |   | 5/1980 | Bianchi et al. | |
| 4,216,178 A | * | 8/1980 | Anderson | 264/9 |

FOREIGN PATENT DOCUMENTS

| | | |
|---|---|---|
| DE | 2020480 A1 | 11/1971 |
| DE | 19859563 A1 | 6/2000 |
| GB | 1548071 A | 7/1979 |

OTHER PUBLICATIONS

Dostalek et al., A Filter Fermenter-Apparatus and Control Equipment, 1982, Biotechnology and Bioengineering, vol. XXIV, pp. 2077-2086.*
International Preliminary Report on Patentability for International application PCT/EP2007/053033, mailed Nov. 27, 2008.

* cited by examiner

*Primary Examiner* — Arun S Phasge
(74) *Attorney, Agent, or Firm* — Novak Druce Connolly Bove + Quigg LLP

(57) ABSTRACT

The invention relates to a process for removing small amounts of water and possible further constituents from alkali metal amalgam, wherein the alkali metal amalgam is brought into contact with an element which is insoluble in mercury and catalyzes the reaction of water with the alkali metal amalgam and the possible further constituents to form hydroxides and hydrogen.

17 Claims, No Drawings

PROCESS FOR REMOVING WATER FROM ALKALI METAL AMALGAM

CROSS REFERENCE TO RELATED APPLICATIONS

This application is a national phase of PCT/EP2007/053033, filed on Mar. 29, 2007, which claims priority to EP 06112058.0, filed on Mar. 31, 2006, the entire contents of which are incorporated herein by reference in their entireties.

The present invention relates to a process for removing small amounts of water from alkali metal amalgam resulting, for example, from a chloralkali electrolysis by the amalgam process. Other constituents which may get into the alkali metal amalgam via the brine used in the chloralkali electrolysis and/or as a result of aging processes in the plant can likewise be removed from the amalgam by means of the process provided. Furthermore, the invention relates to an apparatus suitable for carrying out the process.

Chloralkali electrolysis by the amalgam process is an important industrial process for the production of chlorine. Here, an alkali metal chloride, which is present as brine, i.e. an aqueous solution, is dissociated by means of electric energy into chlorine and alkali metal. The alkali metal forms the alloy alkali metal amalgam with the mercury at the cathode. The alkali metal amalgam formed can be separated from the depleted brine because of a pronounced density difference, but small amounts of water can be entrained with the amalgam stream. In the amalgam process, the alkali metal amalgam formed is usually fed into a decomposer in which it is reacted with water or alcohols over a catalyst to give alkali metal hydroxide or alkoxides and hydrogen, and the mercury which is low in or free of alkali metal is recirculated to the chloralkali electrolysis.

DE-A-198 59 563 describes a process in which the corresponding alkali metal is recovered from the alkali metal amalgam intermediate by electrolysis. Here, the alkali metal amalgam is brought to a suitable operating temperature, which for sodium amalgam should be in the range from 310 to 400° C. and for potassium amalgam should be in the range from 260 to 400° C., in a heat exchanger before it is passed to an electrolysis having an anode comprising alkali metal amalgam, a solid electrolyte which conducts alkali metal ions and liquid alkali metal as cathode.

When using an alkali metal amalgam originating from a chloralkali electrolysis, obstructions and blockages which consist essentially of alkali metal hydroxides can occur every now and again in the lines and plant components. Furthermore, these encrustations take up impurities present in the stream, e.g. rust. For the recovery of the alkali metal from alkali metal amalgam by means of the known process, the action of water, predominantly present as water vapor, has been found to be particularly problematical for the ion-conducting solid electrolyte used.

It is an object of the present invention to provide a process by means of which a plant using alkali metal amalgam can be operated for as long as possible without encrustations which cause blockages. In particular, small amounts of water and possible further contaminating constituents should be able to be removed from alkali metal amalgam in a simple, controllable and economical manner.

This object is achieved by a process for removing small amounts of water and possible further constituents from alkali metal amalgam, wherein the alkali metal amalgam is brought into contact with an element which is insoluble in mercury and catalyzes the reaction of water with the alkali metal amalgam and the possible further constituents to form hydroxides and hydrogen.

It has been found that the deposits which cause the obstructions and blockages can be attributed to the presence of water. The water entrained with the alkali metal amalgam itself leads, in only small amounts, to decomposition of the alkali metal amalgam, forming hydrogen and alkali metal hydroxide which forms encrustations and deposits. This reaction is catalyzed by the presence of particular elements which are insoluble in mercury, for example iron, graphite, nickel, cobalt, titanium, chromium, molybdenum, tungsten carbide and other metals or metal ions. These are present, inter alia, in the material of lines and plant components.

Apart from the entrained water, further constituents which represent contamination are present in the alkali metal amalgam. These can be entrained particles, for example iron particles, which likewise function as catalytically active elements in a decomposition reaction. As a result of entrained iron-comprising particles which can adhere to the wall, encrustations and deposits are formed there and these influence the flow of the alkali metal amalgam. A particularly tough coating in which the iron particles are tightly surrounded by a closely adjacent layer which is composed of hydroxides which can stick together to form relatively large agglomerates and can be readily wetted by mercury is formed here. Apart from aging phenomena of plant components, for example rust formation, the brine used can represent a possible source of the contaminating constituents. The brine composition varies depending on origin and quality. Contaminants in the brine are sulfates, carbonates, silicates and metal ions in general, comprising iron, calcium, strontium, magnesium, barium, zinc and other alkali metal and alkaline earth ions.

It has surprisingly been found that even small amounts of entrained water and further, catalytically active constituents can bring about the obstructions and blockages which can be removed only with great difficulty and with long downtimes associated therewith.

During operation of a plant, the deposits and the contaminating constituents build up so that blocked lines and adverse effects on the subsequent course of the process can occur.

The presence of amalgam-comprising deposits, which can form as a tough layer on surfaces of lines and plant components which is difficult to detach has likewise been found to be disadvantageous. Intensive swirling of water droplets with the alkali metal amalgam, for example in centrifugal pumps, can promote the formation of amalgam butter, as a result of which the further course of the process can be adversely affected. The term amalgam butter is, in the context of the present invention, used to refer to tough, solid agglomerates of hydroxides and amalgam.

In the process of the invention, the catalytically active element is made available so that a very large area is available for a decomposition reaction of the alkali metal amalgam or the further constituents with the water. The hydroxides formed are deposited, while the hydrogen formed can be discharged at a suitable place. The catalytically active element can be regenerated simply by removal of the deposits.

For the purposes of the present invention, an alkali metal amalgam is an amalgam of the alkali metals, preferably lithium amalgam, sodium amalgam, potassium amalgam, rubidium amalgam and cesium amalgam, in particular sodium amalgam and potassium amalgam, most preferably sodium amalgam.

An alkali metal amalgam formed in a chloralkali electrolysis typically comprises from about 0.3 to 5 ppm of water after phase separation. The temperature of the alkali metal amalgam after the phase separation is typically 80° C. The water can cause malfunctions, for example as a result of the formation of deposits in heat exchangers. These small amounts of water can be removed by means of the process of the invention.

According to the invention, the alkali metal amalgam is brought into contact in a precipitator apparatus with an element which does not dissolve in mercury and is suitable for catalyzing a reaction corresponding to the process of the invention. This element catalyzes, inter alia, the decomposition reaction of the alkali metal amalgam with water and can comprise iron, nickel, cobalt, titanium, chromium, molybdenum, steels, inert against mercury, and other metals or metal ions, graphite and tungsten carbid.

In a preferred embodiment the catalytically active element is selected from the group consisting of iron, titanium, molybdenum and steels, inert against mercury. Steels, inert against mercury are for example stainless steel types 1.4401, 1.4541, 1.4571 according to DIN 17440.

To ensure intensive contact of the alkali metal amalgam, the water and the catalytically active element, the element is preferably configured so that a large area around and/or over which the alkali metal amalgam flows without causing a large pressure drop in the alkali metal amalgam stream is provided. According to the invention, the catalytically active element can be provided in the form of a woven mesh, a packing or a bed of shaped bodies in the precipitator apparatus. The catalytically active element is preferably a woven mesh which has been rolled up to form a roll and is arranged in a precipitator apparatus configured as a flow tube within which the decomposition reaction is catalyzed.

The precipitator apparatus is preferably dimensioned so that the alkali metal amalgam flows through it without a large pressure drop but with a residence time which is sufficient for the catalyzed decomposition reaction. In a preferred embodiment, the precipitator apparatus is configured as a flow tube having a diameter of from 100 to 600 mm and a length of from 100 to 2000 mm.

The woven mesh which is preferably used can, for example, be structured by means of longitudinal corrugations so that the flow of the alkali metal amalgam through the precipitator apparatus is aided. To keep the pressure drop over the precipitator apparatus as small as possible, the woven mesh which is preferably used has a mesh opening through which the alkali metal amalgam can pass unhindered.

In a preferred embodiment, the catalytically active element is made up of a plurality of superposed layers. The mesh opening of the first layer is preferably greater than the mesh opening of further layers. In particular, the first layer has a mesh opening of 2 mm and at least one further layer has a mesh opening of 100 μm. The woven mesh or the superposed woven meshes are preferably rolled up to form a roll and may be reinforced by elements running along the flow direction, for example ribs or struts.

When the alkali metal amalgam flows through the precipitator apparatus it comes into contact with the catalytically active element for the decomposition reaction of the alkali metal amalgam with the water, forming hydrogen and alkali metal hydroxide. The hydrogen is partly entrained with the alkali metal amalgam and is discharged from the process at a suitable point. The alkali metal hydroxide forms deposits on the catalytically active element. The proportion of water can be reduced to values of <0.3 ppm, preferably <0.2 ppm, by means of the process of the invention.

Further, contaminating constituents of the alkali metal amalgam can be deposited on the catalytically active element. These can be, firstly, all impurities which are present as amalgam and are decomposed to hydroxides in the presence of water over a catalytically active element. Secondly, the catalytically active element and the deposits formed increasingly act, particularly after a certain period of time, as a filter on which further contaminants, for example solid particles, are deposited. Calcium, strontium and barium impurities, for example, can be separated off in this way. These can also be present as salts, i.e. as chlorides, hydroxides, carbonates or oxides, in the form of solid particles in the amalgam stream.

However, calcium ions can also have been converted during the electrolysis into calcium amalgam which then reacts with water over the catalytically active element to form the corresponding hydroxide and hydrogen.

The process of the invention makes it possible to remove contaminants by formation of deposits within the precipitator apparatus and on the catalytically active element. As the period of operation progresses, the deposits increase so that the pressure drop of the flow over the precipitator apparatus increases. According to the invention, the pressure drop of the precipitator apparatus provides a means of monitoring and controlling the deposits. When the pressure drop exceeds a particular value, the precipitator apparatus can be regenerated by removing the deposits. The regeneration is preferably carried out when the pressure drop exceeds 500 mbar, in particular 1000 mbar. The precipitator apparatus coated with deposits can be regenerated by flushing, preferably with water. During flushing, the deposits are detached from the catalytically active element and flushed out. Flushing times of 30 minutes have been found to be sufficient to dissolve even the more sparingly soluble deposits, in particular the amalgam-comprising deposits. The precipitator apparatus is subsequently dried by blowing a gas stream, preferably nitrogen, into it. In a preferred embodiment, a heated gas stream can be directed through the precipitator apparatus in order to shorten the drying process. The temperature of the gas stream is in the range from 20 to 150° C.

In a preferred embodiment of the process, a plurality of precipitator apparatuses, preferably two precipitator apparatuses, which can be operated alternately are arranged in parallel in the flow path of the alkali metal amalgam. When the pressure drop in one precipitator apparatus exceeds a prescribed value, the flow path of the alkali metal amalgam can be switched over to the parallel precipitator apparatus and the first precipitator apparatus is regenerated. Continuous operation of the process of the invention is possible in this way.

In a further preferred embodiment of the process, at least two precipitator apparatuses, which can be referred to as main precipitator and after-precipitator, are arranged in series. Main precipitator and after-precipitator can have different or preferably identical constructions and be located in separate apparatuses. Here, the after-precipitator has the function of an analysis section which, by means of the intrinsic pressure drop, provides a measure of the completeness of the removal of water from the amalgam in the main precipitator.

In a preferred embodiment of the process, the precipitator apparatus is supplemented by a filter and prevents deposits which become detached from the catalytically active element and are entrained with the alkali metal amalgam from leading to obstructions and blockages in the subsequent plant components. A filter can for this purpose be located downstream of the precipitator apparatus or preferably between the main precipitator and after-precipitator.

In a preferred embodiment of the process, a filter is an integral constituent of the precipitator apparatus and is also regenerated simultaneously with this. Here, the alkali metal amalgam is passed through the catalytic element located in a flow tube, conveyed into a space surrounding the flow tube and then passed through a filter surrounding the flow tube as a sheath before it is fed to further process steps.

In a preferred embodiment of the process, the guide piece before the precipitator apparatus is made of a polymer material in order to avoid a premature decomposition reaction of the alkali metal amalgam with the water entrained in small amounts in this section.

The process of the invention makes it possible to remove small amounts of water from alkali metal amalgam. The water content can be reduced to a value of <0.2 ppm. This reduction in the water content has been found to be sufficient to prevent, firstly, obstructions and blockages in plant components which are caused by the deposits of alkali metal hydroxide formed in a decomposition reaction and/or amalgam-comprising deposits.

The process of the invention offers a simple and inexpensive way of removing traces of water from alkali metal amalgam without a thermal treatment or the use of additional substances being necessary. Furthermore, the alkali metal amalgam can be purified without a large outlay by removal of contaminating constituents. The work-up of alkali metal amalgam by means of the process of the invention can readily be integrated into an existing process without the operation of the overall process being adversely affected. At the same time, the period of operation of a plant can be increased by means of the process of the invention.

The invention claimed is:

1. A process for removing small amounts of water in the range from 0.3 to 5.0 ppm and possible further constituents from alkali metal amalgam resulting from a chloralkali electrolysis, wherein the alkali metal amalgam is brought into contact with a catalytically active element which is insoluble in mercury and catalyzes the reaction of water with the alkali metal amalgam and the possible further constituents to form hydroxides and hydrogen; wherein the catalytically active element is selected from the group consisting of iron, nickel, cobalt, titanium, chromium, molybdenum, steels inert against mercury, tungsten carbide and graphite; and wherein the alkali metal amalgam is subsequently passed to an electrolysis.

2. The process according to claim 1, wherein the amount of water is reduced to a proportion of <0.3 ppm, in the alkali metal amalgam.

3. The process according to claim 1, wherein the catalytically active element is selected from the group consisting of iron, titanium, molybdenum, steels inert against mercury, tungsten carbide and graphite.

4. The process according to claim 1, wherein the possible further constituents are present as corresponding amalgams.

5. The process according to claim 1, wherein the possible further constituents are present as solid particles comprising iron, alkali metals and alkaline earth metals in the alkali metal amalgam and are deposited from this onto the catalytically active element.

6. The process according to claim 1, wherein the catalytically active element is a woven mesh, a packing or a bed of shaped bodies which is located in a precipitator apparatus.

7. The process according to claim 1, wherein the catalytically active element is a woven mesh rolled up to form a roll.

8. The process according to claim 1, wherein the pressure drop over the precipitator apparatus is determined.

9. The process according to claim 1, wherein at least two precipitator apparatuses which are operated alternately are arranged in parallel.

10. The process according to claim 9, wherein the change from the first precipitator apparatus to the second precipitator apparatus is carried out when a particular pressure drop over the first precipitator apparatus is exceeded.

11. The process according to claim 9, wherein the first precipitator apparatus is regenerated after the change.

12. The process according to claim 11, wherein the precipitator apparatus is regenerated by flushing with water and blowing a gas stream having a temperature of from 20 to 150° C. into the apparatus.

13. The process according to claim 1, wherein a plurality of precipitator apparatuses which are arranged in series and in which identical or differently structured catalytically active elements are arranged are comprised.

14. The process according to claim 1, wherein a filter which separates off the detached particles from the precipitator apparatus is arranged downstream of the precipitator apparatus.

15. The process according to claim 1, wherein a filter which is regenerated simultaneously with the precipitator apparatus is integrated into the precipitator apparatus.

16. The process according to claim 1, wherein the amount of water is reduced to a proportion of <0.2 ppm in the alkali metal amalgam.

17. An integrated process, wherein the alkali metal amalgam formed by the process according to claim 1 is brought to a suitable operating temperature, which for sodium amalgam in the range from 310 to 400° C. and for potassium amalgam in the range of 260 to 400° C., in a heat exchanger and subsequently is passed to an electrolysis having an anode which conducts alkali metal ions and liquid alkali metal as cathode.

* * * * *

UNITED STATES PATENT AND TRADEMARK OFFICE
CERTIFICATE OF CORRECTION

PATENT NO. : 8,440,067 B2  
APPLICATION NO. : 12/295371  
DATED : May 14, 2013  
INVENTOR(S) : Martin et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1233 days.

Signed and Sealed this
Eighth Day of September, 2015

Michelle K. Lee
*Director of the United States Patent and Trademark Office*